United States Patent Office 3,043,781
Patented July 10, 1962

3,043,781
BARIUM SILICATE PHOSPHOR
Richard W. Mooney and Francis N. Shaffer, Towanda, Pa., assignors, by mesne assignments, to Sylvania Electric Products Inc., Wilmington, Del., a corporation of Delaware
No Drawing. Filed June 30, 1958, Ser. No. 745,335
1 Claim. (Cl. 252—301.4)

This invention relates to lead-activated barium silicate phosphors, and especially to phosphors of that type which emit long-wave ultraviolet radiation, or so-called "black light," in response to excitation by shorter-wave ultraviolet, for example by radiation in the neighborhood of 2500 angstroms.

Phosphors of that type are already known, and a fluoride is generally used in their preparation. The lead activator, for example, may be added to the original ingredients as a fluoride before firing. It has also been proposed to add a chloride to the phosphor so produced, and then refire the material.

We have found, however, that a considerable amount of chloride ion remains in the phosphor under such circumstances and produces a deleterious effect when the phosphor is used in low pressure mercury vapor lamps. We have further found that the chloride ion can be removed by washing the phosphor in ion-free water, and the efficiency of a lamp using such a phosphor thereby increased.

After the second firing, the phosphor can be ball-milled in water to break up large agglomerates of powder particles and the resultant suspension of fine phosphor particles is washed with ion-free water until the filtrate shows no evidence of chloride ion. The presence of the latter can be detected by the usual silver nitrate test. The treatment will be far less effective if the agglomerates are not broken up before washing.

In one embodiment of the invention, barium carbonate and silicic acid are weighed out in amounts to give the barium disilicate formula. Lead fluoride or a combination of lead oxide and/or barium or lead fluoride are added to this mix in the usual concentrations employed for activators. These compounds are thoroughly blended by successive tumbling and hammermilling operations so as to give an intimate mixture of the components. The resulting mix is fired for a few hours at a temperature ranging from 1900 to 2150° F. in covered crucibles. After a few hours, the crucible is removed from the furnace. When cool, the phosphor is dumped and rolled out to a fine powder. Approximately 4% barium chloride by weight is then weighed out and blended into this mixture, followed by the usual mixing steps. The mixture is then refired for 2 hours at a temperature ranging from 1900 to 2150° in covered crucibles. After 2 hours, the crucible is removed from the furnace and when cool, the phosphor is rolled out to give a uniform powder.

We discovered that the lead-activated barium disilicate made as above is contaminated with chloride ion. To remove the latter, the phosphor is watermilled for approximately ½ hour so as to break up any agglomerates present in the powder. The exact milling time will depend on the size of the batch and the concentration of powder. The time should be kept as low as possible commensurate with a complete breakdown of large particles. After milling, the suspension is removed from the mill and washed free of all chloride ions either by repeated suspensions in ion-free water followed by decantation, or by filtration followed by water washing of the powder left on the filter. As mentioned above, this procedure is continued until the addition of silver nitrate to an acidified sample of the filtrate, in the customary manner for detecting the chloride ion, shows no appreciable amount of chloride.

The following table shows the improvement in ultraviolet output by the use of our method:

| | Ultraviolet Output (Arbitrary Units) | | |
|---|---|---|---|
| | Initial | 100 Hrs. | 300 Hrs. |
| No Milling or Washing | 11,800 | 9,100 | 9,300 |
| Milled and Washed Free of Cl⁻ | 14,400 | 11,300 | 11,600 |

The ultraviolet outputs given by the above table are those obtained when the phosphor is coated onto the inside surface of the glass tube in a fluorescent lamp of the low pressure mercury lamp type. The lamps in the two cases were identical except that the phosphor in the lamps of the bottom line in the table were milled and washed according to our invention.

The units in which the ultraviolet output was measured were arbitrary but linear, that is, the ultraviolet output in each case was directly proportional to the number of units given. The number of hours of operation of the lamps before the readings were taken are given at the head of each vertical column of unit values. The lamps are customarily rated by the 100-hour values.

The phosphors used in the above tests were made according to the process outlined earlier in the present specification, the proportions of ingredients in the initial blend or mixture being as follows:

| Ingredients | Mole Ratio | Grams |
|---|---|---|
| $BaCO_3$ | 1.00 | 789 |
| $SiO_2.H_2O$ | 2.50 | 680 |
| $PbF_2$ | 0.01 | 9.81 |

The above mixture of fine powders was fired for about 4 hours at a temperature of 2015° F. in 7¾ inch covered silica crucibles about 5 inches in diameter, ordinarily called 2-liter crucibles, and then removed from the furnace. When cooled to room temperature the phosphor was dumped out of the crucible and rolled in a manner usual in the art. About 700 grams of the resultant phosphor was then mixed with about 28 grams of barium chloride in the manner previously described, and refired for about two hours at a temperature of 2015° C. The phosphor was then removed from the furnace, cooled and rolled as before.

The phosphor as made above was then tested by being placed in a fluorescent lamp in the usual manner, as a coating on the inside surface of the lamp tube, and when the ultraviolet output of the lamp was tested gave the results shown in the first horizontal line in the above table, the line marked "No Milling or Washing."

Part of the phosphor made as above was then watermilled for about ½ hour in a one-quart ball-mill with 2.5 pounds of ½-inch pebbles, about 400 cc. of water being used for 400 grams of phosphor, to break up the agglomerates of particles present after firing, in order to allow the eventual washing medium to reach what would otherwise be the unexposed surfaces of the particles where they were joined in the agglomerate.

The resultant slurry of phosphor and water was then removed from the ball-mill and put into a beaker or other suitable vessel with enough ion-free water to give about 5 liters of water in all. The material was stirred to form a suspension of phosphor and water, and then the phosphor was allowed to settle out to the bottom of the beaker. With the proportions of water used, the settling was rapid.

The water was then decanted, and the phosphor at the bottom placed on a filter to allow draining of any residual water. The phosphor was then again suspended in water in about the same proportions as before, and the process of washing, decanting and filtering repeated ten times, until the usual and very sensitive silver nitrate test detected no appreciable amount of chloride ions.

The washed phosphor was then coated into a fluorescent lamp identical with that of the "No Milling or Washing" test, the coating being done in the same manner, and the results obtained are given in the above table in the horizontal line marked "Milled and Washed Free of Cl−." The difference is seen to be remarkable.

The proportions of ingredients given can be varied without departing from the spirit and scope of the invention. In fact, our process will improve lead-activated barium silicate phosphors of such different proportions that they emit mainly blue or green light, instead of ultra-violet, although the invention is most effective with the ultra-violet emitting phosphor.

Although a time of 4 hours for the first firing and two hours for the second, has been given in the example, these firing times are not critical and are merely preferred values. They can be varied, if desired, as will be clear from the art.

Although barium chloride is preferred as the source of chloride, other sources can be used, for example, ammonium chloride, calcium chloride or strontium chloride.

What we claim is:

The process for preparing a lead activated, barium disilicate phosphor the steps which comprise: mixing together ingredients necessary to form said lead activated barium disilicate phosphor; firing said mixture at a high temperature in a furnace; removing said mixture from said furnace; fragmenting said mixture and admixing therewith a suitable chloride flux comprising at least one member selected from the group consisting of barium chloride, calcium chloride and strontium chloride; refiring said mixture together with said suitable chloride flux at a high temperature in a furnace; removing the resultant phosphor from the furnace; fragmenting said phosphor to break up agglomerates formed by the firing; and washing said phosphor to remove chloride ions and testing to determine if any residual chloride ions remain; continuing the washing until the phosphor shows no trace of chloride ion and recovering a substantially chloride free, lead activated, barium disilicate phosphor.

References Cited in the file of this patent

UNITED STATES PATENTS

| | | |
|---|---|---|
| 2,499,307 | Ginther | Feb. 28, 1950 |
| 2,541,384 | Rothschild | Feb. 13, 1951 |
| 2,542,322 | Froelich | Feb. 20, 1951 |
| 2,587,592 | Butler | Mar. 4, 1952 |
| 2,597,631 | Froelich | May 20, 1952 |

FOREIGN PATENTS

| | | |
|---|---|---|
| 711,068 | Great Britain | June 23, 1954 |